June 5, 1962 — L. W. MILLER — 3,037,308
COMBINED SCOOP AND GARDEN CART
Filed June 8, 1959 — 2 Sheets-Sheet 1
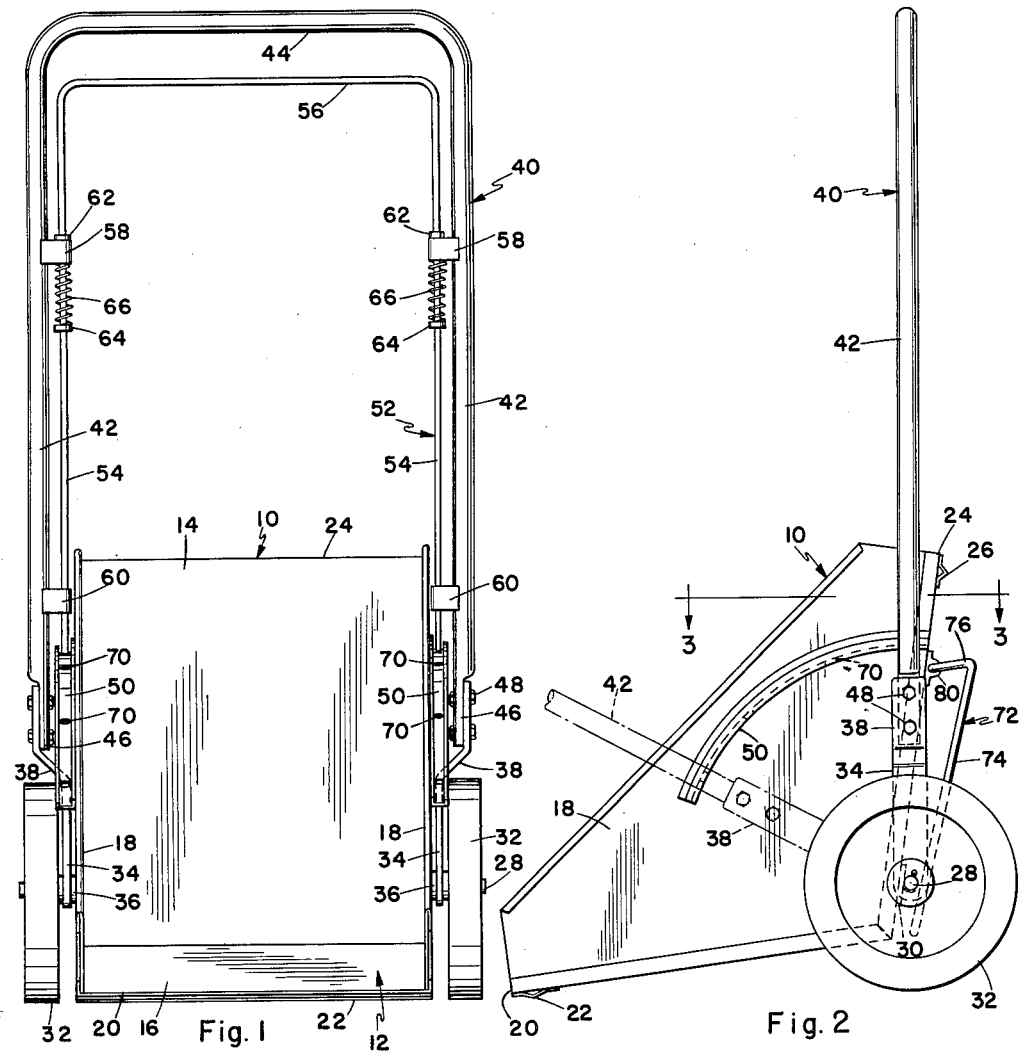
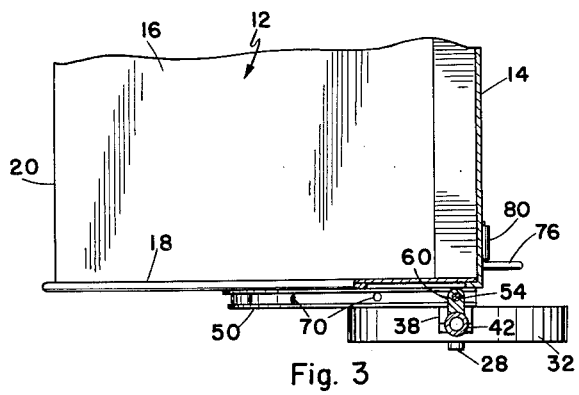
INVENTOR.
LLOYD WILLIAM MILLER
BY Knox & Knox June 5, 1962  L. W. MILLER  3,037,308
COMBINED SCOOP AND GARDEN CART
Filed June 8, 1959  2 Sheets-Sheet 2

INVENTOR.
LLOYD WILLIAM MILLER
BY *Knox & Knox*

United States Patent Office 3,037,308
Patented June 5, 1962

3,037,308
COMBINED SCOOP AND GARDEN CART
Lloyd William Miller, Escondido, Calif., assignor to Specialty Manufacturing Company (Alfred Vang)
Filed June 8, 1959, Ser. No. 818,634
3 Claims. (Cl. 37—130)

The present invention relates generally to garden implements and more particularly to a combined scoop and garden cart.

The primary object of this invention is to provide a garden cart having a body which serves as a carrier and is provided with an angularly adjustable handle, which facilitates angular positioning of the body for uses including the important use as a pull-scoop, pull-scraper and pull-leveller with the handle in a convenient operating position.

Another object of this invention is to provide a combined scoop and garden cart in which the handle can be locked in several different positions, so that the body can be held in various attitudes.

Still another object of this invention is to provide a garden cart having a foldable stand attached to the body which supports the body in a generally horizontal position for loading.

A further object of this invention is to provide a combined scoop and garden cart which is simple in structure, light in weight and adaptable to many different uses.

Finally, it is an object to provide a combined scoop and garden cart of the aforementioned character which is simple and convenient to use and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawings which form a material part of this disclosure, and in which:

FIGURE 1 is a front elevation view of the garden cart;

FIGURE 2 is a side elevation view thereof;

FIGURE 3 is a fragmentary sectional view taken on the line 3—3 of FIGURE 2;

Similar characters of reference indicate similar or identical elements and portions throughout the specification and throughout the views of the drawings.

Figure 4:
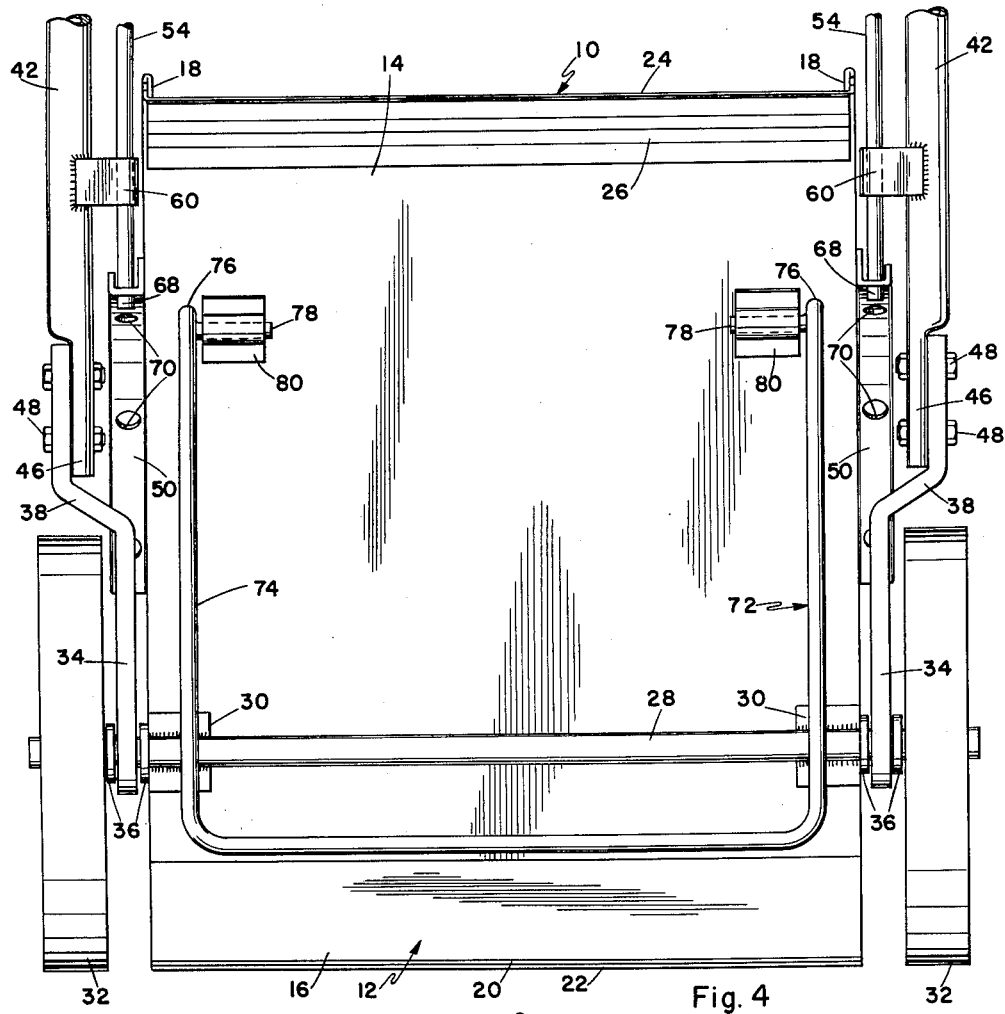
FIGURE 4 is an enlarged rear elevation view of the art.

The cart comprises a body 10 having a V-shaped pan 12 which includes a back plate 14 and a bottom plate 16, said pan being enclosed by substantially triangular side plates 18 secured to the edges of the pan. The forward edge or lip 20 of the bottom plate 16 is reinforced by a transverse stiffener 22 and the upper edge 24 of back plate 14 is reinforced by a transverse stiffener 26. The body 10, as illustrated, is made of sheet steel or other suitable material welded together, but may be pressed or otherwise formed as a unitary structure if desired.

Fixed to the black plate 14 adjacent the lower end thereof is a transversely extending axle 28, which is secured to doubler plates 30, welded or otherwise attached to said back plate. Mounted on the ends of the axle 28 are wheels 32, which may be of a suitable commercially available type with ball bearings and rubber tires as desired. Attached to the axle 28 between wheels 32 and the body 10 are two swing arms 34, spaced between washer 36 for free swinging movement about the axle. Each swing arm 34 has an outwardly joggled, offset portion 38 for additional clearance from the body 10 and fixed to the offset portions is an elongated, U-shaped, tubular handle 40 having side members 42 connected at one end by a cross member 44. The ends of the side members 42 are flattened, as indicated at 46, and are secured to the offset portions 38 by bolts 48 or the like.

Fixed to the outside of each side plate 18 is an arcuate, channel sectioned, locking rack 50, said locking racks having a center of radius coincident with the axis of axle 28. Mounted inside the handle 40 is a generally U-shaped locking yoke 52 having side bars 54 joined at one end by a cross bar 56, said side bars being longitudinally slidable in spaced guides 58 and 60 fixed to the inside of the side members 42. The side bars 54 are provided with spaced upper and lower stops 62 and 64, respectively, fixed thereto on opposite sides of the upper guides 58, as in FIGURE 1. Fitted between the guides 58 and the lower stops 64 are compression springs 66 which bias the locking yoke 52 downwardly. The lower ends of the side bars 54 comprise lock pins 68 and the locking racks 50 are provided with spaced pairs of sockets 70 to receive said lock pins. Thus by manually raising the locking yoke 52 against the springs 66, the lock pins 68 are released from any particular pair of sockets 70 in which they have been placed and the handle 40 can be swung to a different angular position relative to the body 10.

Figure 5:
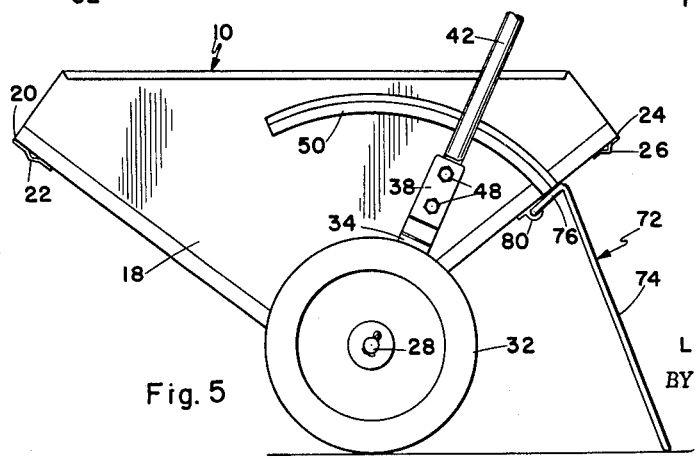
FIGURE 5 is a fragmentary side elevation view showing the supporting stand in open position.

In order to support the body 10 in a generally horizontal position, as in FIGURE 5, in which position the body can be filled in the manner of a wheelbarrow, a foldable stand 72 is secured to the back plate 14. The stand 72 is a generally U-shaped frame 74 of steel rod, or the like, the upper ends of which have angularly turned, parallel stop portions 76, the ends of said stop portions having inwardly turned, opposed hinge portions 78 which are pivotally secured in brackets 80 fixed to the back plate 14. In the open position of the stand 72, the stop portions 76 rest against the back plate 14 and hold the stand in an angularly downwardly extending position, the precise angle of offset of the stop portions being determined by the length of the frame 74 and the angular disposition of the back plate 14 with the body in horizontal position. When folded, the stand 72 folds against the back plate 14, and may be held by the friction of the hinge portions 78 in the brackets 80 caused by a spring tension in the frame 74, or may be provided with a suitable retaining clip if necessary.

In the fully back position of the handle 40, indicated in full line in FIGURE 2, the cart can be pushed or handled as a conventional cart or carrier with many types of loads. It is quite important to note that, with the handle 40 in the fully forward position, indicated in broken line in FIGURE 2, the cart can be used as a scoop by pulling forwardly and allowing the front edge or forward lip 20 to dig into the ground or a heap of material with a scooping action. The same position is used for scraping or levelling, the pulling rather than pushing action providing easier control and requiring less effort. Intermediate positions of the handle allow the body to be held in various positions for different purposes and many other functions will become apparent in the use of the cart. The handle 40 may be completely released and free from the racks 50, so that the body can be dragged to spread a load or tipped completely over for dumping.

It will be evident that the combined scoop and garden cart is a versatile implement with many uses other than in gardening. The construction is simple and light in weight, yet is sufficiently sturdy to withstand considerable usage under many conditions. The handle can be quickly adjusted by one hand if necessary and is positively locked in the various positions.

The operation of this invention will be clearly comprehended from a consideration of the foregoing description of the mechanical details thereof, taken in connection with the drawings and the above recited objects. It will be obvious that all said objects are amply achieved by this invention.

Having described this invention as an operative unit, it is now thought quite important to note a further advantage of the novel construction, namely, the suitability of the above illustrated structure for shipment in partially unassembled or "knock down" form. The principal feature here is the easily removable handle 40 and locking yoke 52. The simple removal of bolts 48 makes the complete handle and yoke assembly detachable and considerable space saving and crating is avoided, the retailer or ultimate consumer being enabled to assemble the device quickly and easily.

It is understood that minor variation from the form of the invention disclosed herein may be made without departure from the spirit and scope of the invention, and that the specification and drawings are to be considered as merely illustrative rather than limiting.

I claim:

1. A combined scoop and garden cart, comprising: a load carrying body having a generally V-shaped plate member forming a flat bottom plate and a flat back plate, and triangular side plates fixed to said plate member; the forward edge of said bottom plate being a reinforced scoop lip; an axle fixed to the lower portion of said V-shaped plate member and having wheels rotatably mounted at opposite ends thereof symmetrically with said V-shaped plate member; a generally U-shaped handle pivotally attached at its ends to said axle adjacent to said wheels; arcuate rack members fixed to said side plates concentric with said axle, and having radially-oriented locking sockets therein; said handle being adjustably securable to said rack at different angles with respect to said body, the handle being securable in a fully forward position with said scoop lip depressed into contact with the ground and the device being then usable as a pull scoop, pull scraper, and pull leveller, a generally U-shaped locking yoke positioned within and parallel to said U-shaped handle, said U-shaped locking yoke terminating in locking pins; and spring means for positioning said locking pins of said locking yoke in said locking socket of said rack members.

2. A combined scoop and garden cart, comprising: a load carrying body having a generally V-shaped plate member forming a flat bottom plate and a flat back plate, and triangular side plates fixed to said plate member; the forward edge of said bottom plate being reinforced to form a scoop lip; an axle fixed to the lower portion of said V-shaped plate member and having wheels rotatably mounted at opposite ends thereof symmetrically with said V-shaped plate member; a handle pivotally attached to said axle adjacent to said wheels and securable in a fully forward position with said scoop lip depressed into contact with the ground and the device being then usable as a pull scoop, pull scraper and pull leveller; and a stand mounted on said body by pivot means and, in its inoperative position, being folded close to and substantially parallel to said flat back; said stand being pivotally extendable to support said body in a generally upright position and having an angularly turned stop portion, adjacent said pivot means, engaging said body when said body is in said upright position and said stand is extended.

3. A combined scoop and garden cart, comprising: a load carrying body having a generally V-shaped plate member forming a bottom plate and a flat back plate, and side plates fixed to said plate member; the forward edge of said bottom plate being reinforced and constituting a scoop lip; an axle fixed to the lower portion of said back plate and having wheels rotatably mounted at opposite ends thereof; a generally U-shaped handle pivotally attached at its ends to said axle adjacent to said wheels; arcuate rack members fixed to said side plates concentric with said axle; and having spaced sockets therein; a generally U-shaped locking yoke mounted within said handle and slidable generally parallel to the plane of the handle; said locking yoke having end portions engageable in said sockets to lock said handle in selected angular positions relative to said body including a fully forward position when said scoop lip is depressed into contact with the ground, and the device then being usable as a pull scoop, pull scraper and pull leveller; said locking yoke being biased toward said rack members; a stand pivotally attached to said back plate and positioned to lie close to said flat back plate in a folded position; said stand having stop portions engageable with said back plate to hold the stand in an extended position angularly disposed with respect to the back plate, whereby said body is supported in a generally horizontal position.

References Cited in the file of this patent

UNITED STATES PATENTS

| | | |
|---|---|---|
| 23,610 | Robison | Apr. 12, 1859 |
| 827,542 | Lawson | July 31, 1906 |
| 1,015,969 | McCrary | Jan. 30, 1912 |
| 2,852,872 | Benz | Sept. 23, 1958 |
| 2,867,449 | Shawver | Jan. 6, 1959 |